July 13, 1965 R. S. SAKURAI 3,194,674

APPARATUS AND METHOD FOR DUPLICATING MESSAGES WHICH ARE ELECTROSTATICALLY CHARGED, DEVELOPED AND FIXED ON A MASTER DIELECTRIC MEDIUM ONTO COPY MEDIA CAPABLE OF RETAINING ELECTROSTATIC CHARGES

Filed May 24, 1961 5 Sheets-Sheet 1

INVENTOR.
RICHARD S. SAKURAI
BY Joseph P. Kates
ATTORNEY

APPARATUS AND METHOD FOR DUPLICATING MESSAGES WHICH ARE ELECTROSTATICALLY CHARGED, DEVELOPED AND FIXED ON A MASTER DIELECTRIC MEDIUM ONTO COPY MEDIA CAPABLE OF RETAINING ELECTROSTATIC CHARGES

Filed May 24, 1961

INVENTOR.
RICHARD S. SAKURAI
BY Joseph P. Kates
ATTORNEY

July 13, 1965 R. S. SAKURAI 3,194,674

APPARATUS AND METHOD FOR DUPLICATING MESSAGES WHICH ARE ELECTROSTATICALLY CHARGED, DEVELOPED AND FIXED ON A MASTER DIELECTRIC MEDIUM ONTO COPY MEDIA CAPABLE OF RETAINING ELECTROSTATIC CHARGES

Filed May 24, 1961 5 Sheets-Sheet 3

INVENTOR.
RICHARD S. SAKURAI
BY Joseph P. Kates
ATTORNEY

APPARATUS AND METHOD FOR DUPLICATING MESSAGES WHICH ARE ELECTROSTATICALLY CHARGED, DEVELOPED AND FIXED ON A MASTER DIELECTRIC MEDIUM ONTO COPY MEDIA CAPABLE OF RETAINING ELECTROSTATIC CHARGES

Filed May 24, 1961

INVENTOR.
RICHARD S. SAKURAI
BY
Joseph P. Kates
ATTORNEY

APPARATUS AND METHOD FOR DUPLICATING MESSAGES WHICH ARE ELECTROSTATICALLY CHARGED, DEVELOPED AND FIXED ON A MASTER DIELECTRIC MEDIUM ONTO COPY MEDIA CAPABLE OF RETAINING ELECTROSTATIC CHARGES

Filed May 24, 1961 5 Sheets-Sheet 5

INVENTOR.
RICHARD S. SAKURAI

BY Joseph P. Kates
ATTORNEY

United States Patent Office 3,194,674
Patented July 13, 1965

3,194,674

APPARATUS AND METHOD FOR DUPLICATING MESSAGES WHICH ARE ELECTROSTATICALLY CHARGED, DEVELOPED AND FIXED ON A MASTER DIELECTRIC MEDIUM ONTO COPY MEDIA CAPABLE OF RETAINING ELECTROSTATIC CHARGES

Richard S. Sakurai, Philadelphia, Pa., assignor to Burroughs Corporation, Detroit, Mich., a corporation of Michigan Filed May 24, 1961, Ser. No. 121,276
17 Claims. (Cl. 117—17.5)

The present invention relates to an electrostatic printing system. More particularly, it relates to an electrostatic printing system for producing multiple copies from a charged, inked and fixed master which has been produced by the electrostatic printing process.

In the electrostatic printing process, the indicia to be printed, such as letter, lines, dots, etc. are first formed as invisible electrostatically charged surface areas on a recording medium by means of silent electrical discharges from a first suitably shaped and/or suitably positioned electrode or array of electrodes towards a second electrode or group of electrodes, the recording medium being disposed between the first and second electrodes. Subsequently, the discharged areas are made visible by application of finely divided, conductive pigmented powder to the surface of the recording medium. This powder is the developing agent or ink. The ink powder is held to the medium by electrostatic attraction substantially over the charged areas only. The powder image thus obtained is fixed by heat (or pressure) to produce a permanent record.

Such electrostatic printing systems are described in U.S. Patent No. 2,919,170 to H. Epstein for "Means for Electrostatically Recording Signals," issued December 29, 1959, and U.S. Patent No. 2,955,894, to H. Epstein for "Page Printing Apparatus," issued October 11, 1960. Both of these patents are assigned to the Burroughs Corporation, the assignee of the present invention.

The type of apparatus described in these patents is suited particularly to high speed production of a printed record. Higher operating speed is critical in many applications such as directly recording the output of electronic computers or of telemetering receivers, because of the high rate of data output produced by such equipment and presented as output to be printed. The apparatus of the above-cited patents provides rapid and satisfactory production of a single copy of output data at a very fast rate.

Such systems require a simple, economical and rapid method of making copies. The method of making copies should be preferably automatic. It is advantageous to use the above-described electrostatic printing processes to produce copies additional to the first copy produced.

In the electrostatic printing means of the above-mentioned patents, a voltage is applied to a pin acting as a cathode. The pin is located above a sheet of polyethylene or other dielectric layer which together with a supporting relatively conductive paper layer forms the recording medium. Application of the voltage to the pin initiates a discharge to the polyethylene coating (dielectric surface) of the paper, depositing the charge in the polyethylene. The spot of charge occurs below the pin.

In the present invention, after the dielectric recording medium is charged in spots, the message, as in the above-described electrostatic printing process, is inked and then fixed. The ink material is the conductive inks used in the above-described electrostatic printing process. This recorded, ink and fixed sheet is the master in the multiple copy process of the invention. The master is superimposed over but spaced slightly from another sheet of polyethylene or polystyrene coated paper which is the copy. High voltage is applied to the back of the master. The copy back is grounded. A discharge occurs between the master spots and the copy polyethylene paper. The copy is then inked and fixed in the electrostatic printing process described in the above-enumerated patents. Since the discharge occurs between the master spots and the copy paper only, the copy receives a message duplicate of the master.

The method and means of the present invention provides many important advantages of prior art multiple copy methods which involve transfer of electrically controlled developer powder from an insulating non-conductive image layer to a strip of transfer material. Such a method includes that of U.S. Patent No. 2,576,047 of R. Schaffert, issued November 20, 1951, for "Method and Apparatus for Printing Electrically." Such methods are not fast enough, are cumbersome, and are not adaptable easily to electrostatic printing, and do not provide the reliability, accuracy and speed of the present invention.

Accordingly, an object of the present invention is to provide a simple, economical, accurate, practical and rapid means and method for making multiple copies from an electrostatic printing produced master, the method and means comprising additional electrostatic printing steps and means wherein the master forms the cathode electrode.

Another object of the present invention is to provide for producing copies utilizing the advantages of the electrostatic printing means and method and wherein the copy is a message duplicate of the master.

Another object of the present invention is to provide means for providing copies from a master by electrostatic printing means wherein the master can be reused a very large number of times to produce a very large amount of copies, which system employs the speed and other advantages afforded by the electrostatic printing process and wherein production of the master is as simple as the electrostatic printing process.

Another object of the present invention is to provide a simple, very fast operating electrostatic process, and means to provide copies which are message duplicates of a master utilizing an electrostatic printing process of making multiple copies from an electrostatically produced master, the copies having the recording produced thereon by electrostatic means wherein the charge spots of the master which have been inked and fixed are used as cathodes when superimposed above the recording medium which forms the copies in closely spaced relationship and a voltage is impressed across the master-copy pair, the difference in potential being sufficient to provide a discharge between the master and the copy.

While the novel and distinctive features of the invention are particularly pointed out in the appended claims, a more expository treatment of the invention in principle and in detail together with additional objects and advantages thereof, is afforded by the following description and accompanying drawings in which:

Figure 1:
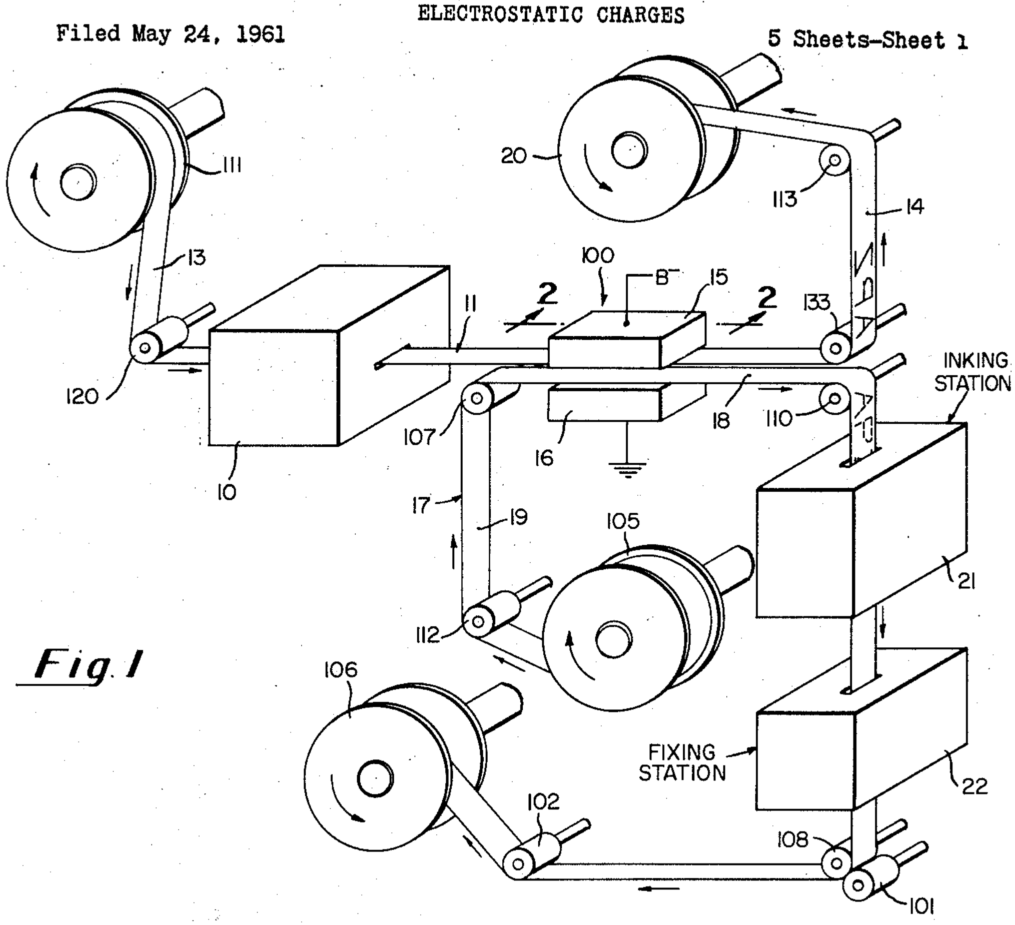
FIG. 1 is a schematic representation illustrative of a first embodiment of the present invention.

In the electrostatic printing method and apparatus to which applicant's invention relates (see the aforementioned patents assigned to the assignee of the present invention), a recording material which may comprise either a paper or carbonaceous paper tape coated with a dielectric such as polyethylene, polystyrene, etc. is drawn between a print electrode and a second electrode. The second electrode may be grounded. The tape may rest on the second electrode as it is drawn past the two separated electrodes. Upon providing a sufficiently high potential difference across the electrodes, a discharge occurs from the print electrodes toward the grounded electrode. The discharge is intercepted by the dielectric on the tape. The charge is believed to penetrate to some depth into the dielectric. Subsequently the tape is moved through solid ink particles which are conductive. After the tape passes through the ink particles it becomes visible by the adherence of the ink to the tape where charged. The ink pattern is fixed by heat or pressure.

In the present invention the conductive ink deposited upon the tape forms a cathode. The printed electrodes form a cathode and emit the discharge after application of high voltage to the printed electrodes. In the invention the high voltage is applied to the recording medium back. The ink deposited on the recording material if of material which can be used as a cathode acts as a cathode and discharge emanates from the inked charged spots. The ink utilized in the electrostatic printing devices and methods of the patents assigned to the assignee of the present invention is acceptable. For example, acceptable inks comprise a dispersion which consists of nine (9) parts by weight of hydrocarbon resin, Picco 45H (Pennsylvania Industrial Chemical Corp.) or equal; nine (9) parts by weight of styrenated hydrocarbon resin, Piccoflex 115 or equal; twelve (12) parts conductive carbon, Statex F–12 (Columbian Carbon) or equal, less than one (1) part by weight of soya lecithin, (Yelkin TTS (Ross and Rowe) or equal; and less than seventy (70) parts by weight of industrial xylene (Picco Hi-Solv X or equal). The amounts of lecithin and solvent are adjusted to give the finished dispersion a viscosity of less than 53 on the Krebs scale. The dispersion is ball-milled with steel balls or otherwise treated to a degree of dispersion so that the dispersion is sieved through 100 mesh. The millet dispersion has a Hegman gauge number less than 3. The dry dispersion has an average electrical square surface resistance not exceeding 1500 ohms.

This is spray dried to a dry, free flowing, electrically conductive powder. The spray dried product is aged for a least six weeks in open containers before further processing. The dried and aged product is sieved through 140 mesh (by an Abbe Turbosifter, for example). The carrier of the liquid dispersion is protected from freezing. the ink is known as thermoplastic electrostatic recording ink, Type 1128.

A form of ink of good conductive properties which has been tested for the inventive process is that described in patent application Serial No. 676,716, filed August 5, 1957, for "Electrographic Printing Ink," of Charles P. West et al., which application is assigned to the assignee of the present invention. That ink is an inking powder in which the particles are all of substantially the same composition and are uncharged, electrostatically, in their normal unused condition. The ink is of high electrical conductivity. This ink is made by spray drying a ball-milled slurry comprising a carbon black, a synthetic resin, a solvent and a wetting agent and selecting a preferred distribution of sizes with the resulting particles, either by regulation of the process itself or by subsequent screening, if necessary. The ink is dry, black, electrically conductive, of relatively low specific gravity, and flows freely. An example of one formulation of such a slurry follows:

| | Percent |
|---|---|
| Carbon black: "Statex F–12" (Columbian Carbon Corp.) | 41 |
| Resin: "Picco 450H" (Pennsylvania Industrial Chemical Corp.) | 59 |

The above are percentages by weight in a dry mixture of the two components.

| | Percent |
|---|---|
| Solvent: "Toluene, Industrial" | 63 |
| Wetting agent: "Soya Lecithin Yelkin TTS" (Ross & Rowe, Inc.) | 1.6 |

The last two percentages are by weight in the wet mixture.

"Yelkin TTS" is an oil soluble commercial lecithin (62% with soybean oil) of fluid consistency, which has a brilliant amber color according to the "Handbook of Material Trade Names," by O. T. Zimmerman and I. Lavine, published by Industrial Research Service, Dover, New Hampshire, 1953 Edition, which describes this product on page 631.

This slurry is ball-milled to form a dispersion of the carbon black in the dissolved resin. For example, in preparing a laboratory sample (2,000 grams) of such a dispersion, the mixture is loaded into an Abee assay ball mill with a 22 pound load of one-half inch steel balls and the mill rotated at 36 r.p.m. for eight hours. The better the dispersion of the slurry, the less viscous and less thixotropic it is and in general the better the conductivity of a mass of the dry ink obtained therefrom.

When suitable disperson has been accomplished, the slurry is dried in a spray dryer. As manufactured by the Bowen Engineering Company, for example, this comprises an atomizer, a drying chamber and a size-selective collector. The slurry is fed into the atomizer where it is broken up into droplets which are then carried to a cocurrent vortex of hot air in the drying chamber to remove the solvent. The resulting dry particles are directed by the air stream into one or more collectors of the cyclone type. The adjustment of these collectors may serve to supply particles restricted to the desired size range directly or subsequent screening may be resorted to. In the laboratory type Bowen dyer a centrifugal-type atomizer is used with a wheel speed of approximately 12,000 revolutions per minute to give an optimum yield of particles in the desired size range.

The properties of the components and their proportions and the slurry from which the powdered ink is formed are not extremely critical, although there are certain preferred ranges of values. Carbon black is chosen from a class known in the trade as "conducting furnace blacks," of which the various grades of "Statex" are examples, are most suitable to supply conductivity to the ink. Graphite, as a source of carbon in general, does not give as high electrical conductivity as is desired.

As to the resin, many synthetic and natural resins have properties suitable for the described purposes. Certain thermoplastic hydrocarbon resins and combinations of resins manufactured by the Pennsylvania Industrial Chemical Corp., which have the prefix "Picco" as part of their names, have proved satisfactory for this use, a specific example, "Picco 450H" being given above. In addition, Panarez 6–210 (Pan American Chemical Co.) and certain of the phenolic Bakelite resins have proved suitable.

The "Picco" resins are coumarone-indene resin products having melting points ranging from well below 100° C. up to about 120° C. and are disclosed in U.S. Patent No. 2,287,513, F. W. Corkery and R. H. Bailey, issued June 23, 1942, and assigned to the Pennsylvania Industrial Chemical Corporation, of Clareton, Pennsylvania, and are described in a brochure headed with the name "PICCO" and entitled "PICCOUMARON—Para-Coumarone Indene Resins," available from the assignee of U.S. Patent No. 2,287,513. "Picco 450H" resin is a catalytically synthesized coumarone-indene polymeric resin of moderate molecular weight having a degree of polymerization responding to a melting point of about 112° C. by the ball and ring method and having a color in the lightly colored range equivalent to a color figure no greater than 3 on the para-coumarone resin color scale. "Panarez" resins sold by Pan American Chemical Corporation, New York, are hydrocarbon resins derived from petroleum sources, produced by the polymerization of olefins and diolefins, and available in color grades ranging from pale lemon to dark brown with a normal softening point of 200–220° F. or 93–104° C., according to "The Condensed Chemical Dictionary, 5th ed., revised by Arthur and Elizabeth Rose, Reinhold Publishing Corp., New York, 1956, at page 819. Panarez 6–210 has a softening point just below 140° C. and a color of 2½ on the Gardner Scale. Alternatively, a phenolic resin with similar thermoplastic properties as aforementioned involving similar softening points and melting points suitable for heat fixing during brief exposure to a temperature around 300° F. or 150° C. but without unwanted softening under usual conditions can be utilized.

The specific gravity of the resin particles should be low, preferably not more than about 4.0, to reduce the effect of gravity. For heat fixing, thermoplastic resins having suitable softening temperatures (relative to the printing medium employed) are selected. The upper limit of this temperature for use with paper media is around 300° F.

The percentage of resin to carbon (by weight) in the finished ink is about 0.8 to 1.6. To give the desired conductivity to the dry ink, the carbon should be present as at least 35 to 40 percent of the mixture of resin and carbon.

The resin solvent should be suitable for the type of resin used with weight given to for toxicity and other properties. Toluene, benzine and xylene are suitable solvents for hydrocarbon resins while alcohol is suitable for some phenolic resins. The amount of solvent used is that required to give a dispersion viscosity suitable for efficient milling and for feeding to the atomizer. Most solvents are used in the range of 55 to 70 percent by weight in the wet mixture. A small amount of wetting agent is beneficial in processing the slurrying. As high as about 2.6% has been satisfactorily used. An excessive amount produces a sticky poorly flowing powder.

Ink particle sizes should be such that $d_g$, the geometric mean of the particle diameters, is within the range of 12 to 40 microns and 98% by weight of the particles have diameters within the range of 5 to 80 microns.

The ink must flow freely when applied to the surface of the printing medium. Hence, the angle of repose of the mass of powder should not exceed 40% with respect to the horizontal.

The disclosure herein of certain electrostatic ink formulations and methods of manufacture is by way of illustration and not by way of limitation of the invention. Other inks may be used which act as a cathode when placed between two surfaces at a difference of potential which cause a discharge from the cathode toward one of the surfaces.

Now referring to the drawings, and in particular to FIG. 1, the recording medium 11 is passed through electrostatic printing system 10 which may be a system such as those shown in the aforementioned U.S. Patents 2,919,170 and 2,919,171. The recording medium 11 which emerges therefrom contains a visible message of conductive ink spots 12. The recording medium comprises preferably a relatively conductive support layer and a non-conductive dielectric layer. In printing system 10 a mirror image of the message which is to appear on copy material is electrostatically charged in the dielectric layer of the recording medium and then the above described conductive ink is applied and fixed.

The recording medium 11 is preferably made of a backing layer 13 or web of paper on one side of which is bonded a thin layer 14 of high resistivity or dielectric material. The period of time necessary to establish an electrostatic charged area on the dielectric layer 14 in electrostatic means 10 is in the order of $10^{-9}$ seconds (1 nanosecond) or less. This makes it possible to move the recording medium through the printing station, the place where the electrically charged areas are established, at high speed. A suitable material for the recording medium master of the present invention is described in U.S. patent application Serial No. 714,767, of Robert E. Benn and Herman Epstein, filed February 12, 1958, for "Electrographic Recording Process" and in its continuing application Serial No. 255,715, of the said Robert E. Benn and Herman Epstein, filed January 25, 1963, for "Recording Medium and Process of Developing Latent Electrostatic Image on a Recording Medium," application Serial No. 714,767 having been forfeited in favor of continuing application Serial No. 255,715, both applications being assigned to the assignee of the present invention.

The dielectric layer of the recording medium is made of a thermoplastic material having resistivities of high value, such as polyethylene, or polystyrene, for example. The backing layer 13 is of paper approximately .003 inch thick. Bonded to one side of the backing layer 13 of the recording medium 11 is the thin dielectric layer 14 which is approximately .0005 inch thick. The dielectric layer 14 is made of polyethylene to which has been added substantially 15%, by weight, of titanium dioxide as a pigment. A preferred formulation of backing layer 13 is 1500 pounds of dry unbleached Scandinavian pulp with substantially no alum or sizing added, plus 75 pounds of standard commercial grade carbon black. The polyethylene coating is extruded onto the paper.

Another formulation satisfactory for the backing layer consists of 1500 pounds of dry fully bleached Scandinavian pulp, 75 pounds of carbon black, 25 pounds of starch sizing and 70 pounds of alum. The electrical resistivities of backing layers made of either formulations are of the order of $5\times10^6$ ohm-centimeters. The resistivity of the polyethylene is of the order of $10^{15}$ ohm-centimeters or more. The resistivity of the backing layer is a function of the amount of carbon black dispersed in the layer. The amount of carbon black to be added to the batch of pulp obtained a given resistivity is determined empirically.

Backing layers of electrical resistivities in the range from $10^5$ to $10^9$ ohm-centimeters, produce good inking at reasonably high rates of travel of the second medium, i.e. 100 inches per second without requiring an excessive size inking station. Backing layers having a resistivity greater than $10^{10}$ ohm-centimeters are not satisfactory. Papers of less than $10^5$ ohm-centimeters are not satisfactory for use with electrostatic printing apparatus when back switching is used. Where a single back electrode is used, there is no lower limit for minimum values of backing layer resistivities.

Generally papers whose resistivities are primarily determined by ionic conductors dispersed in the papers have not, without means such as humidors to control the moisture problem, proved to be as commercially desirable as carbon black. The reason for this is that the resistivity of the backing layer is then primarily a function of its moisture content. When the moisture content is low, the resistivity of the paper is greater than the upper limit of the desired range of values. Carbon black is the most satisfactory material discovered which, when mixed with paper pulp, produces the desired range of resistivities, substantially independent of the moisture content of the layer and without adversely affecting the physical characteristics of the backing layer.

The capacitance per unit area of a ½ mil thick layer of polyethylene is substantially 1100 micromicrofarads per square inch. With a 3 mil thick layer of backing layer 13 having a resistivity of $5 \times 10^6$ ohm-centimeters, the time constant of the recording medium is approximately 6.1 microseconds. The amount of charge in an equivalent capacitor is a function of the time constant of the circuit.

The paper is made additionally conductive by use of more carbon black in the backing. The capacitance across the backing layer is reduced and the resistivity reduced accordingly where a carbonaceous backing is utilized.

Figure 2:
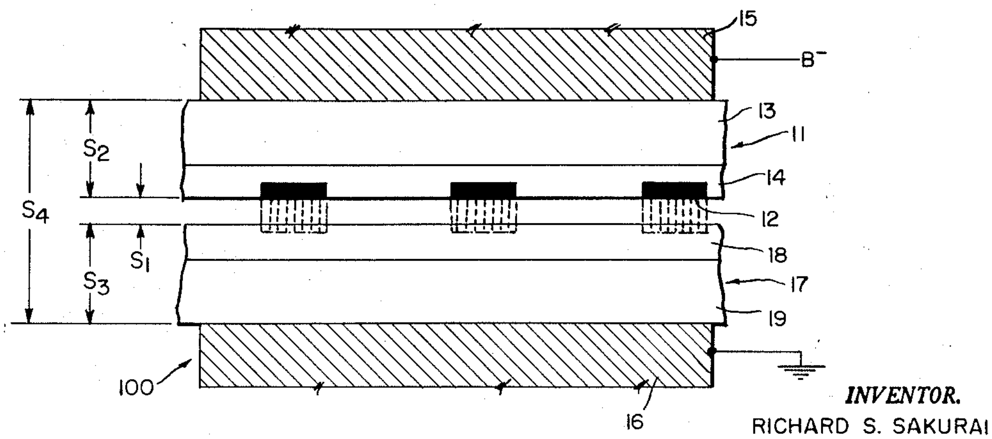
FIG. 2 is an enlarged view of portions of FIG. 1 indicated by the arrows 2—2 illustrative of charging the copy with a mirror image of the indicia on the master.

Referring now to FIG. 2 which shows an enlarged view of the duplicating station 100 of FIG. 1, the tape 11 drawn from the electrostatic printing system 10 is the master copy which is then duplicated in station 100.

Tape 11 is drawn in abutting relationship past the metal plate 15. Metal plate 15 is charged with a negative high voltage of the order of −1500 volts from a source of high voltage B−. Simultaneously, copy recording medium 17 is drawn over grounded metal plate 16 in abutting relationship with plate 16. Copy recording medium 17 comprises a paper backing layer 19 and a polyethylene dielectric substance coating 18. It may be identical to recording medium 11.

The negative high voltage from source B− applied to the metal plate 15 depends upon the separation of plates 15 and 16. It is sufficient to effect discharge from the ink applied spots 12 in the dielectric layer 14 of master copy 11. This discharge is in the nature of a Townsend avalanche directed toward areas directly below spots 12 and on the dielectric surface layer 18 of copy material 17.

Hence, when the sheet of electrostatic printing paper 11 is charged with message spots in the usual electrographic or electrostatic printing manner and then the charged spots are inked with a material which can be used as a cathode such as the conductive ink heretofore described and the inked spots are fixed in the inventive multiple copy process, and apparatus, the master is held over another sheet of recording medium suitable for the electrostatic printing process, the copy. High voltage is applied to the back of the master, while the back of the copy is grounded. The dielectric surface containing the inked message is facing the copy surface on which the recording is to be duplicated. An electrostatic discharge occurs then from the fixed and inked spots on the master towards the opposed grounded copy surface which intercepts this electrostatic discharge to have the true image copy of the mirror image master electrostatically charged on the copy surface.

After discharge has been effected, the master 11 may be reused. For this purpose, master 11, for example, is drawn around rollers 133 and 113 and wound upon winding reel 20. The master may be rewound and instead of from electrostatic printing means 10, the master tape can be drawn as many times as copies are required past the metal plate 15 and superimposed above as much copy paper material as necessary for the copies required. The copy material is drawn through duplicating station 100 in abutment with metal plate 16 in the same manner as described where the tape emerges from the electrostatic printing system 10.

The copy is then drawn through inking station 21 where the electrostatically charged areas are inked. After it emerges from inking station 21 the inked message on copy 17 is fixed in fixing station 22 in the usual electrostatic printing manner as disclosed in aforementioned Patents 2,919,170 and 2,919,171. The copy material then is drawn around rollers 103 and 102 and wound on take-up reel 106. The copy material 17 could be cut also by various means (not shown) at intervals determined by, for example, the length of the master message on master 11.

Figure 9:
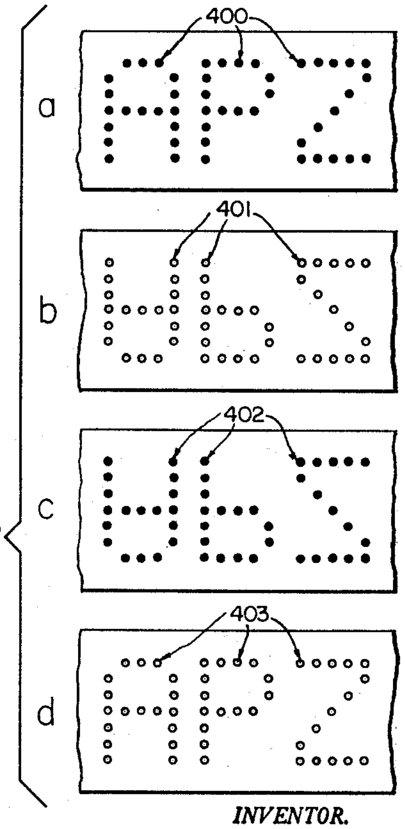
FIGS. 9*a*, *b*, *c*, and *d* illustrate charging, inking and mirror image relationship in message transfer between tapes.

Since the discharge across plates 15 and 16 occurs only between the master spots and the copy polyethylene paper, the copy is a message duplicate of the master. However, as shown in FIGS. 9*c* and *d* the copy is a mirror image of the master. In the FIG. 1 embodiment, it is assumed that a mirror image of the true image is printed on tape 11. Tape 17, after inking, then shows the true image of the massage.

The master can be used and reused an almost unlimited amount of times. The system can be operated substantially as fast as the electrostatic (electrographic) printing process allows. However, due to the use of the master recording medium (paper), the discharge does not take place in substantially a nanosecond rate as in normal electrostatic printing such as effected in printing system 10. The discharge rate is in the order of microseconds rather than nanoseconds because of the relatively non-conductive paper disposed between the negative high voltage source electrode 15 and the ground electrode 16. Therefore, the speed at which the papers can be drawn past between the two electrodes must be slower than the speed which is permissible for electrostatic recording, where work is drawn past and discharge occurs from the pins.

In the invention, a capacitor is formed by the charged polystyrene or polythylene layer on the paper which is conductive and the metal plate which is conductive and the paper which is relatively a dielectric material which separates these conductors. Because of the capacitance of this capacitor time is required for charge of the capacitor formed by the two plates comprising the conductive ink 12 and the metal plate 15 and the paper layer 13, which time is appreciable. This time is of the order of microseconds. Therefore, the speed of the paper drawn through could be too fast. This time is appreciable and must be taken into account.

Where conductive backing paper is utilized, such as carbon paper, the process is faster. However, any of the paper (recording media) used for electrostatic printing of the type of this invention, for example, may be used for the master of for the copies.

The inner or bottom surface of the dielectric layer 14 of the master into which conductive spots 12 are embedded and the top surface of layer 18 of the copy paper 17 upon which the discharge is to occur are separated by a distance S1. This distance should not be greater than 3 miles (.003″). The metal plates are therefore spaced apart a distance S4 in accordance with the thickness S2 and S3 of the tapes 11 and 17 plus the distance S1. Distance S4 may be of the order of .015″. This assumes that tapes 11 and 17 have a total tape thickness of not greater than. .012″. If of equal thickness each of tape 11 and tape 17 are not greater than .006″ thick.

The opposed facing surfaces of the master 11 and copy 17 could be in contact with each other. If the master paper 11, which acts as a cathode, is in contact with the lower copy paper 17, the process is faster. However, with such contact, some background noise develops due to pulling these papers apart. The gap S1 is desirable because of this background noise.

The polyethylene layer could be made thin enough such that the conductive ink portions deposited therein in the printing means 10 extend entirely through the dielectric to the paper layer 13. This is preferable. However, in presently available paper, the ink spots are made to penetrate only partially through the dielectric layer 14.

The ink 12 which has been fixed into the polyethylene layer 14 of the master 11 does not go across the space onto the copy polyethylene paper 17. Only the charge crosses. Hence, following the electrostatic copying station 100 formed by electrodes 15 and 16 and the masters and copies going therethrough under high voltage differences between the electrodes; in inking and a fixing step for the copy is required as in the conventional electrostatic printing process wherein a single copy is produced by charge from the pin electrodes.

In the embodiment of FIG. 1, at the original electrostatic printing station, a mirror image is printed on the master so as to get a true image on the copy. If this were not done, the copy would have mirror images thereon. Therefore, the voltages applied to the pins at the electrostatic printing station are such as to give a mirror image of the message characters or patterns.

Figure 3:
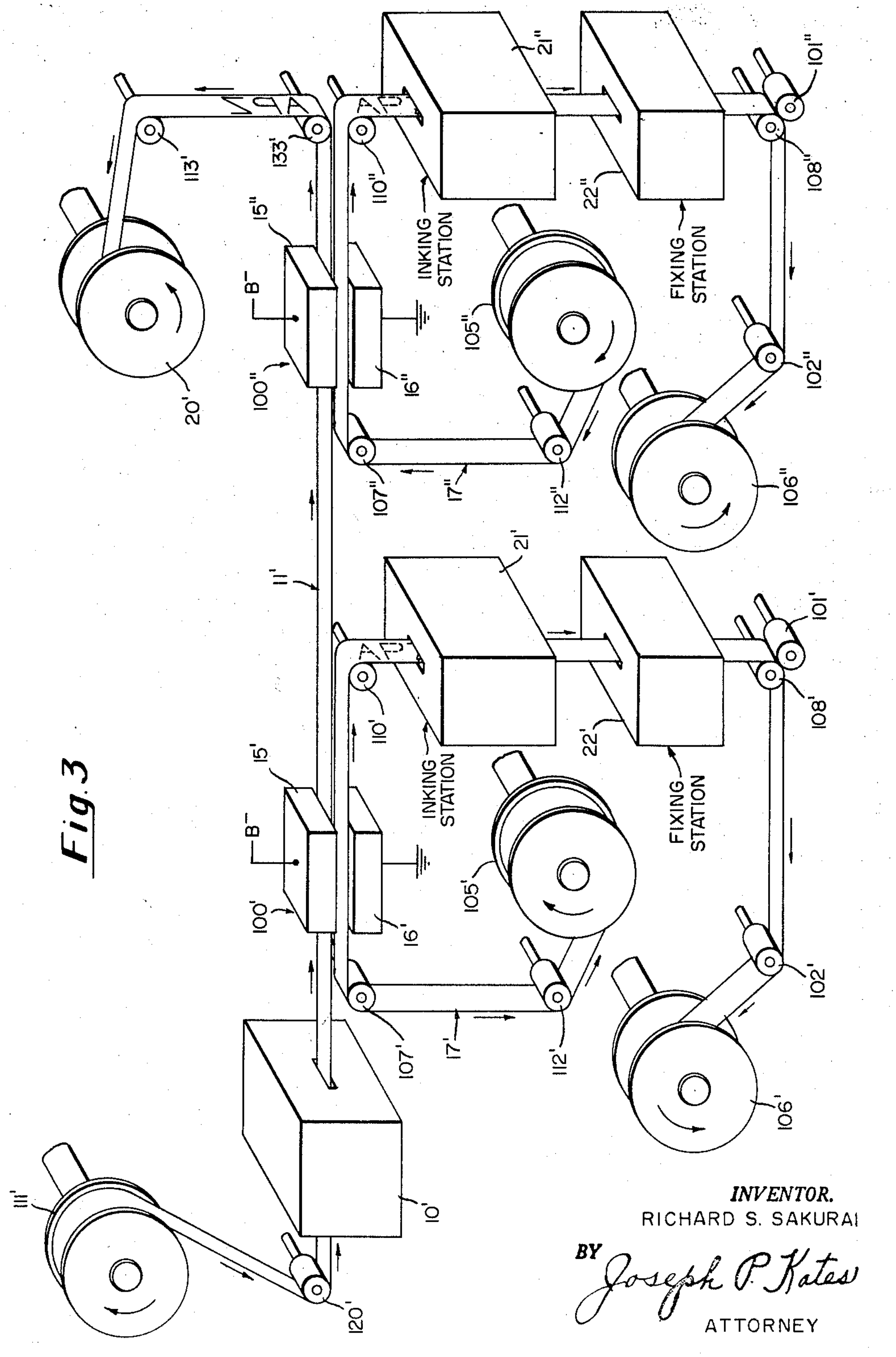
FIG. 3 is a schematic representation of another embodiment of the invention, similar to that of FIG. 1 but adding a means and method of whereby multiple copies are produced from the master.

Referring to FIG. 3, there is shown an embodiment for providing multiple true copies of the mirror image imprinted master. The embodiment of FIG. 3 is similar to that of FIG. 1 except that a plurality of duplicating stations are provided.

From the supply reel 111', the tape 11' is passed under roller 120' and through electrostatic printing station 10'. As in the FIG. 1 embodiment, in electrostatic printing station 10', the master 11' by electrostatic printing, has an electrostatic discharge imprinted thereon comprising a mirror image of the message for which multiple copies are desired. After charging, inking and fixing in printing station 10', the tape 11' is drawn through duplicating station 100' with the tape 11' upper flat surface in abutment with the lower surface of electrode 15'. Electrode 15' is a metal plate which is electrically charged to a potential of the order of —1500 volts. Tape 11', upon emerging from electrostatic printing station 10', has its inked and fixed message imprinted upon its dielectric layer which is its downward face. The upward face of tape 11' is drawn in abutting relationship to the undersurface of electrode 15'.

From supply reel 105', the copy recording medium 17' is passed under roller 112' and over roller 107' through duplicating station 100'. A grounded electrode 16' is disposed in duplicating station 100' and has a top surface which is aligned with and directly opposed to the undersurface of electrode 15'. Recording medium 17' is passed in abutting relationship with and along the upper surface of electrode 16'.

In passing through duplicating station 100', the top surface of copy recording medium 17' is disposed in facing relationship to and aligned with the lower printed surface of master recording medium 11'. Spacing between the under-surface of recording medium 11' and the top surface of recording medium 17' is of the order of not over 3 mils, as in the FIG. 1 embodiment.

The difference in potential between the potential applied to electrode 15' and electrode 16', the latter being shown grounded by way of illustration, is that necessary to cause discharge from the inked message under-surface of tape 11', to the opposed facing surface of copy 17'.

This is a discharge which is electrostatic and which causes invisible charges to occur directly below the inked spots on the underside of recording medium 11'. After being charged, the copy recording medium 17' is passed over roller 110'. Charged recording medium 17' is then, as in the FIG. 1 embodiment, passed through inking station 21' where the charged characters are inked and through fixing station 22' where the inked copy is fixed. After emerging from fixing station 22', the inked and fixed recording medium 17' is drawn between opposed roller surfaces 101' and 108', under roller 102' and is wound upon take-up reel 106'.

The master 11', which has its under-surface charged and inked, is not appreciably affected by the discharge therefrom in duplicating station 100'. It continues through a second duplicating station 100" which comprises the charged plate electrode 15" and the grounded plate electrode 16". Duplicating station 100" is similar to duplicating station 100' and tape 11' is passed in abutting relationship to the under-surface of metal plate electrode 15" as it was under the metal surface of plate 15' of duplicating station 100'.

A second copy recording material supply reel 105" is provided for the second duplicating station 100". Recording medium 17" is unwound from supply reel 105", passed under rollers 112' and 107" and passed in abutting relationship to electrode 16" and in spaced relationship to but inalignment with the under-surface of recording medium 11'.

Upon the two recording media 11' and 17' being drawn simultaneously through duplicating station 100" and with the application of the difference in potential between electrode 15" against which tape 11' bears and electrode 16" against which recording medium 17" bears, discharge occurs from the message ink characters on the underside of recording medium 11' to the upper surface of copy recording material 17" as in the duplicating station 100'.

After leaving the second duplicating station 100", the master mirror image recording medium 11' is wound under roller 133' and over roller 113' and taken up on take-up reel 20'.

Copy recording medium 17", which has an invisible pattern of charges from the discharge from master 11' is passed over roller 110" and through inking station 21" where the charged message is inked to render the message visible. The copy 17", upon emerging from inking station 21", is passed through fixing station 22" where the inked charge is fixed. The tape is drawn out of fixing station 22" and passed through rollers 101" and 108" and under roller 102" and is wound upon take-up reel 106".

Two stations for multiple copies are shown by way of illustration in the FIG. 3 embodiment. It will be readily apparent from observation of FIGS. 1 and 3 that as many duplicating stations may be provided as copies are desired. This can be effected by the additional duplicating stations, separate copy recording material supply means being provided at each station and the master continuing through each duplicating station provided in abutting relationship to the respective plate electrodes of each of the duplicating stations. Additional support may be provided for the master if required, because of additional length of the master before winding on reel 20'.

Figure 4:
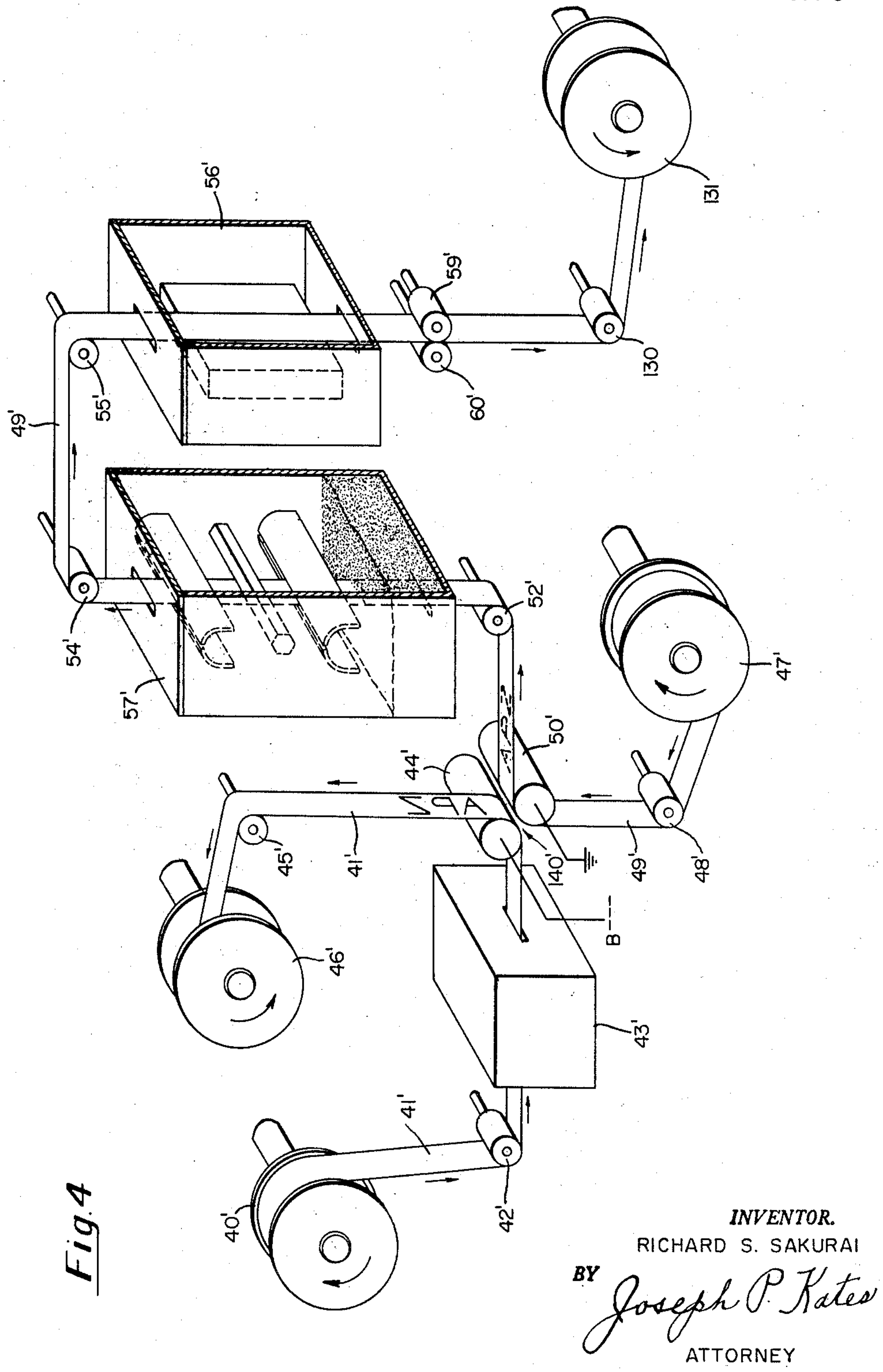
FIG. 4 is a schematic representation of an embodiment of apparatus incorporating the present invention wherein a mirror image is applied during the first printing step of the master such that the master retains a mirror image which becomes a true image on the copy.

Referring to FIG. 4, an embodiment of the invention utilizing rollers in the duplicating station electrodes is provided. In this embodiment, from supply reel 40', the recording medium material upon which the master message is to be imprinted is passed under roller 42'. The master recording medium 41' is then passed through electrostatic printing station 43' where the master message is applied in the form of a mirror image electrostatic invisible charge. This charge is inked and fixed in station 43' in the manner taught in the aforementioned U.S. Patents Nos. 2,919,170 and 2,919,171. The master 41' is then passed around roller printing electrode 44' in sliding bearing relationship to roller electrode 44'. Roller electrode 44' has a high potential applied from source B−−−. The master 41' is then passed over roller 45' and wound on take-up reel 46'.

From copy recording medium supply roll 47' the copy medium material 49' is passed under roller 48' and over roller electrode 50′. Electrode rollers 44′ and 50′ comprise duplicating station 140′ and are closely adjacent with their axes in parallel relationship. Roller electrode 50′ may be grounded.

As in the above-described embodiments, the master recording material 41′ and the copy recording material 49′, when passed through duplicating station 140′ between roller electrodes 44′ and 50′ are in opposed aligned parallel relationship. At the opposed points of tangency wherein they bear against respective roller electrodes 44′ and 50′, tapes 41′ and 49′ are spaced apart a distance preferably not over 3 mils (.003″). The opposed cylindrical surfaces of electrodes 44′ and 50′, against which the recording materials 41′ and 49′ are disposed, are spread apart a distance equal to the 3 mil spacing between the recording media plus the thicknesses of the recording media. The difference in potential between roller electrodes 44′ and 50′ is such that when the inked master 41′ is passed adjacent to the copy 49′ the difference in potential between the lower imprinted surface of tape 41′ and the facing upper surface of tape 49′ is sufficient to cause discharge thereacross from the inked message on tape 41′ to the clear surface of copy tape 49′.

Although shown as a tape of relatively narrow width dimension, wider dimensions could readily be utilized and the device used as a page printer. It is possible to perforate the copy at intervals or else to provide cutting mechanism to cut the tape 49′ into desired lengths such as for pages of a newspaper or book, where desired.

After emerging from roller 50′ in duplicating station 140′, the copy tape 49′ is passed underneath roller 52′ and through inking station 57′, where ink is applied to the charged characters on copy tape 49′ to render the message imprinted thereon visible. After emerging from inking station 57′, copy 49′ is passed over rollers 54′ and 55′ and through fixing station 56′ where, by means of heat and/or pressure, the inked copy may be fixed. From fixing station 56′, the copy is passed between rollers 59′ and 60′ and beneath roller 130 and is taken up on take-up reel 131.

As in the embodiment of FIG. 3, the master could be continued past additional rollers in a plurality of duplicating stations similar to station 140′, each of which stations is provided with a copy introducing mechanism and material for passing beneath the master where the copy is charged from the master.

Although shown with the roller 44′ having a voltage B−−− applied to the master print electrode and the anvil roller electrode 50′ being grounded, it will be understood that the voltages will depend upon spacing and physical characteristics and the difference in potential will be sufficient to cause discharge from master to copy under the particular ambient conditions encountered. For purposes of convenience, the anvil electrode is grounded but the invention is not restricted to a grounded anvil electrode.

Figure 5:
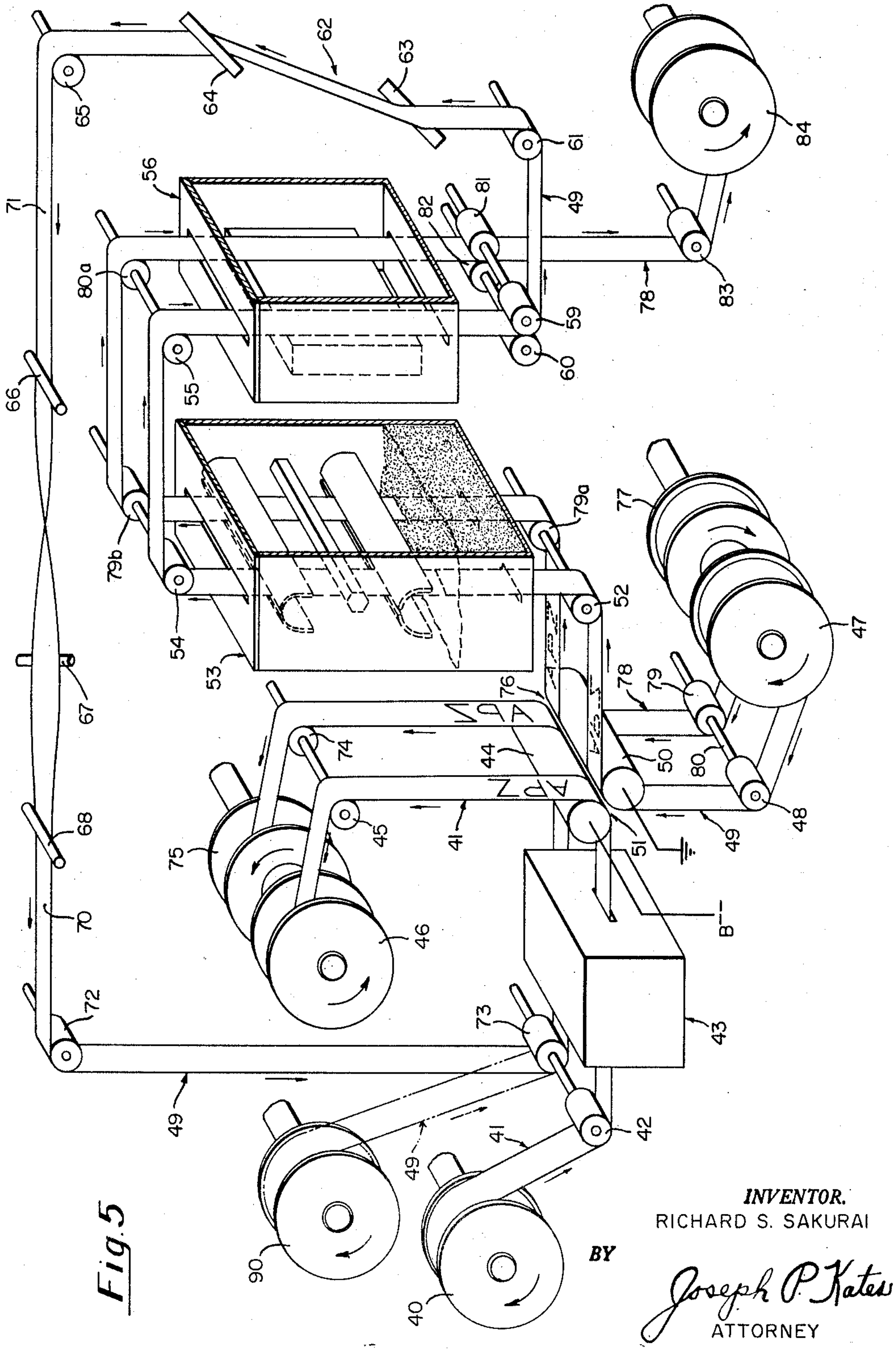
FIG. 5 is a schematic representation of another embodiment of the invention wherein the master is printed with a true image which appears as a mirror image on the first copy, which first copy is then recirculated as a mirror image master to provide true image copies from the mirror master.

Now referring to FIG. 5, a system embodying the invention is shown wherein the master recording material is printed by the electrostatic process with a true image. The copy upon which the master imprints a mirror image is recycled to become the new master. This image copy (the new master) is placed upon an endless system such as that of FIGS. 6, 7 and 8 herein. The new master is recirculated through the duplicating station of FIG. 6, 7 or 8 for each copy and is reused for as many true copies as required.

In the embodiment of FIG. 5, a supply roll of tape or other required recording medium blank tape 41 may be of the same material as the previously described dielectric paper. The blank tape 41 passes under roller 42 and through electrostatic printing, inking, and fixing station 43. In station 43 the message is applied by charging tape 41, inking and fixing. The tape 41 emerges with the message printed on its under dielectric surface as shown by the letters APZ shown thereon. The tape 41 is passed around a portion of the cylindrical surface of drum 44 in continuous abutting slidably bearing relationship. Print roller 44 is charged to a high negative voltage from a source B−−. The tape 41 is drawn in the direction of the arrows shown adjacent to tape 41. Tape 41 is drawn around roller 45 and is wound upon drum or reel 46. Drum 46, when wound with the tape supplied from drum 40 and printed upon an electrostatic printing station 43, contains a first true copy of the message or pattern to be reproduced. A second roll of recording medium which may be tape 49 is supplied from supply reel 47. Tape 49 is drawn around roller 48. From roller 48, tape 49 travels around a portion of the cylindrical surface of a second print roller 50. Print roller 50, the anvil roller, is grounded. Print rollers 44 and 50 are in closely adjacent relationship with their axes disposed parallel to each other and their closest adjacent cylindrical surfaces are spaced a distance equal to the thickness of the tape 41 plus the thickness of the tape 49 plus about 3 mils (.003″) distance between the tapes. Separation of the tapes, as in the other embodiments, rather than permitting the tapes to touch, eliminates noise. The difference in potential between source B−− and ground (or other potential difference which is applied across the two drum electrodes 44 and 50) is sufficient to cause discharge from the inked spots on the master which act as cathodes to the copy surface. The potential difference necessary is usually of the order of 1500 volts but depends upon such factors such as the thickness of the tapes and their constituency. At the print station 51, comprising the grounded roller 50 and the charged roller 44 the conductive spots on the tape 41 which act as discharging electrodes permit the tape 50 to become charged with a pattern which is a mirror image of the pattern printed on the tape 41. The charged tape 49, after passing grounded roller electrode 50, is drawn past change direction roller 52 into inking station 53. After inking of charged recording material 49 in inking station 53, the tape 49 is drawn around change direction rollers 54 and 55. The inked tape 49, then passes through the fixing station 56 where the inked charge is fixed by heat and/or pressure. From fixing station 56 the mirror image copy 49 is drawn between rollers 59 and 60. Upon exit from between rollers 59, 60, inked and fixed tape 49 is drawn past roller 61. Tape 49 is continued through a means 62 comprising a first and a second angled roller member 63 and 64 respectively. This causes lateral displacement of the plane in which tape 49 is traveling. The fixed image tape 49 then is changed in direction again by roller 65 which it passes over. Tape 49 is required to be reversed for printing true image copies. It is twisted by twisting means comprising parallelly disposed straightening pin 66, vertically disposed pin 67 and smoothing pin 68. Tape 49 is twisted around substantially vertically disposed pin 67 and smoothed by pin 68. The tape 49 thus is flipped over to present the inked surface on its upper surface 70 rather than on its lower surface 71 where it heretofore appeared. To effect this flipping, tape 49 is passed under pin 66, then in front of pin 67 and under pin 68. The representation of letters on the tape shown at the left of roller 52 before the tape 49 reaches pin 66 illustrates that the inked characters are on the tape underside 71 and the solid letters appearing on tape 49 between electrode 44 and roller 74, illustrates that the inked characters are on the upper side of the tape when flipped over by the action of pins 66, 67 and 68. The tape 49 is then drawn over roller 72 and fed downward and around roller 73. From roller 73, tape 49 is drawn behind printing station 43 to a laterally displaced portion of charged drum or roller electrode 44. At electrode 44 the relatively conductive paper surface of tape 49 is drawn over electrode 44 in contiguous abutting relationship, the tape slidably bearing over drum 44 as it passes under drum electrode 44. Tape 49 is then directed in the direction of the arrows over direction change roller 74. The tape 49 then is wound upon drum 75. A second copy recording material supply reel 77 supplies recording material which may comprise tape 78 to which the message on the mirror image master 49 is non-destructively transferred. By non-destructive transfer is meant that the message is charged upon the copy tape without removal of it from the master so that the message on the master may be again duplicated on copies a substantially unlimited number of times. After being drawn off supply reel 77, tape 78 is directed towards the vertically upward direction by roller 79 mounted in axial alignment with roller 48 upon a common shaft 80. Roller 79 is displaced axially from roller 48. Copy tape 78 is drawn over grounded anvil electrode 50 at a locus opposed to the longitudinal position along electrode 44 where the tape 49 is drawn. Thus, at the ends of rollers 44 and 50 opposite those respectively carrying tapes 41 and the initial portion of tape 49, a second station 76 comprises the other end of rollers 44 and 50 where tape 49 is run after having the mirror image of tape 41 printed thereon and after axial displacement and inversion. Tape 78 is run so that its flat upper surface is parallel with and faces the dielectric inked surface of tape 49.

The section 76 which comprises the end of rollers 44 and 50 opposite that end traversed by the tape 41 then is traversed by the ink fixed and returned tape 49. Tape 49 is then wound upon roller 75. On its traversal around a portion of the cylindrical surface of roller 44, tape 49 acts as the master and on discharge therefrom when the tapes are in abutment with respective electrodes 44 and 50, the mirror image of tape 49 is electrostatically charged onto tape 78 to provide a true image on tape 78 at the printing station 76. The tape 78, which is charged by the difference in potential which, on passing duplicating station 76, causes a discharge from the inked spots on tape 49 across to the paper 78, then passes around roller **79*a* which is mounted on a shaft common with roller 52. Tape 78 is then advanced through the inking station 53 in a laterally displaced path to that of tape 49 where tape 78 is inked. The inked tape 78 then passes around roller 79*b* which is mounted in axially aligned but displaced relationship to roller 54 and on the same shaft as roller 54. Tape 78 is then drawn around roller 80*a* which is mounted in axially aligned but displaced relationship to and on the same shaft as roller 55. From roller 80*a*, tape 78 is advanced through the fixing station 56 in a path displaced from the path through fixing station 56 through which tape 49 passed. The inking station 53 and/or the fixing station 56 may be large enough to accommodate both tapes 49 and 78 or may be sectional. After emerging from fixing station 56, the copy 78 is passed between smoothing rollers 81 and 82. Rollers 81 and 82 may be on the same shafts respectively as smoothing rollers 59 and 60. Tape 78 is then advanced around roller 83 and wound on reel 84. After winding of tape 84 thereon, reel 84** contains a true copy of the message.

When reel 84 is completely wound, it is removed and an empty reel disposed in its place. Reel 75 has wound thereon the tape 49 containing the inked and fixed mirror image of the message to be duplicated. The tape thereon may be rewound upon reel 90 (assuming that tape from reel 40 no longer is being emitted from the first printing station and wound on reel 75). The paper on reel 90 which contains the properly wound mirror image is disposed underneath and around a circumferential portion of roller 73 (as shown in the dashed line representation of tape 49).

Assume that the tape 41 is exhausted and no tape is fed to roller 73 from rollers 72 to roller 73. From around roller 73 the mirror image, inked, fixed tape 49 from roller 90 is passed around print roller 44 at the station 76 end and around roller 74 onto roller 75 or a replacement therefor. Tape 49 from roller 90 may be threaded similar to threading of a movie or other film roll. In this manner, the tape 49 may be reused repeatedly to recruit replacements for roll 77 to be inserted so that replacements for tape 78 may be advanced past station 76 and opposite the new tape 49 and thence through the inking and fixing process to roller replacements for roller 84. Multiple copies may be produced thus. The apparatus of FIG. 5 may be used for applications requiring a single copy by omitting the structure of reel 90. Where multiple copies are desired, a device such as those of the embodiments of FIGS. 6, 7 and 8 hereinafter described can provide the extra copies.

Figure 6:
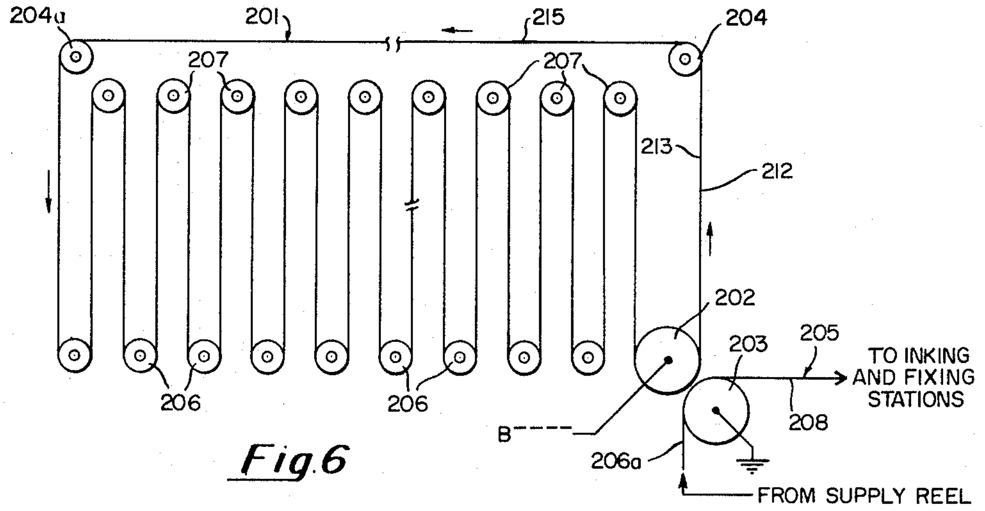
FIG. 6 is a schematic representation of another embodiment of the duplicating means and method of the invention wherein an elongated record can be run in a compact manner to enable duplication of voluminous printed material.

Referring to FIG. 6, an embodiment of a separate duplicating station in accordance with the inventive teaching is provided which is especially adapted to duplication of the matter printed on a long roll of paper or of tape. This embodiment is advantageous in deploying the master duplication of the matter printed on the master into a compact space. The master copy 201 is printed with an inked and fixed message in accordance with the processes and apparatus illustrated in FIGS. 1, 2, 3, or 4. Master 201 then is joined at point 215 to form a continuous loop. The dielectric surface 212 containing the electrostatic charged, inked and fixed message is disposed on the outside surface of recording material loop 201.

Drum or roller electrodes 202 and 203 are provided. Roller 203 is grounded electrically. Roller 202 is connected to a high voltage source B− − − −. Other voltages than B− − − − and ground may be applied to the electrodes but the difference in potential between 202 and 203 is made sufficient to cause a discharge from the receiving medium inked portion of the dielectric surface bearing against electrode 202 toward the drum electrode 203 when the drum 203 is covered by a copy recording medium 205. Recording medium 201 is advanced over respective rollers 204 and **204*a*, and alternatively back and forth over successive rollers 206 and 207 in sequence until the tape 201 is advanced around electrode 202. Roller 202 is a print electrode at the high potential, applied when the medium 201 is in abutting relationship thereagainst with the carbonaceous or paper layer 213 of the medium disposed against 202. While recording medium 201 is continuously drawn over electrode 202, copy recording medium 205 having dielectric surface 206*a* and relatively conductive surface 208 is drawn from a supply reel (not shown). Copy 205 is advanced then over a portion of the cylindrical surface of grounded drum electrode 203 where medium 205 is continuously imprinted upon by discharge from the inked surfaces of recording medium 201. After having the fixed, inked pattern of tape 201 electrostatically charged thereon to form an invisible mirror image, the charged tape 205** is fed to an inker and fixer (not shown) as in the usual electrographic process.

The message on the surface 212 of recording medium 201 is then imprinted as a mirror image upon the facing surface of recording medium 205 continuously and repetitively as long as recording medium 205 is supplied from the supply reel. As many copies as desired are produced on copy medium 205.

After each copy is produced by automatically initiating triggering at the end of each revolution of the message on tape 201, tape 205 may be cut to provide separate copies.

Figure 7:
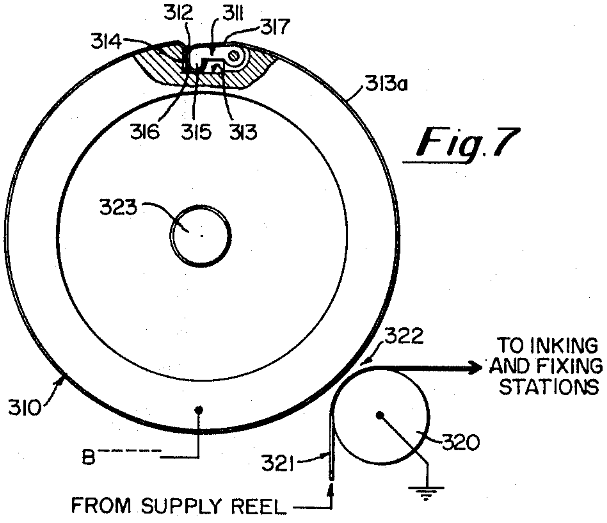
FIG. 7 is a schematic representation of a drum wherein the master is run off as a mirror image and attached to the drum to provide a plurality of copies.

Referring to FIG. 7, this embodiment of the duplicating station of the invention is suitable especially for page and other printing where the original message is short, substantially of size adaptable to be drawn around a drum.

In this embodiment, a cylindrical drum 310 is provided. Drum 310 has a groove 313 machined or formed otherwise normal to its outer cylindrical surface. Groove 313 extends the length of cylinder drum 310. Rotatably attached to extend normally outward to and retract into the groove 313 of drum 310 is a lug 311 which has an extending finger 315. Finger 315, when in drum retracted position of lug 311, has a surface 316 adjacent finger 315 of lug 311 which, together with wall 314 of groove 313, forms a relatively narrow confining groove 312. A length of the dielectric recording material 313*a* which has the message which is to be reproduced electrostatically charged, inked and fixed thereon is provided. When lug 311 is rotated crosswise away from its drum engaged position, an end of recording medium sheet 313 is tucked around the finger 315 portion and drawn around its groove forming surface 316 and its upper surface 317. Sheet 313*a* is drawn taut around drum 310 and its end opposite its lug 311 folded end sheet 313*a* is tucked against wall 314 of groove 313 in the cylindrical electrode member 310. The lug 311 is then retracted into the drum groove 313. The space between the end face 316 of finger 315 and the wall 314 is of size such that the double thickness of dielectric 313 formed by tucking against wall 314 and the opposed end which is tucked around finger 315 is together slightly more than the grooved distance between wall 314 and face 316. By being compressed in groove 312, the compressible sheet 313*a* is firmly attached to the cylindrical surface of drum electrode 310. Drum electrode 310 is electrically connected to a source of potential B−−−−−.

In parallel, opposed alignment to the surface of drum 310 in close proximity is a grounded drum electrode 320. A supply of recording medium receiving material is drawn from a supply reel (not shown) around the cylindrical surface portion of grounded drum electrode 320 which is adjacent to the cylindrical surface portion of drum 310. The adjacent to drum 320 portion of the surface of drum 310 is covered by recording medium 313*a* in adjacent position. The recording medium material 321 from the supply reel, which is drawn around a portion of the circumference of the cylindrical drum surface of drum 320, is the copy. The voltage supplied from source B−−−−− is of magnitude such that the copy 321 is charged with a mirror copy of the message on master recording medium 313*a*. After being electrostatically charged at the station 322 comprising the closely spaced apart drum 310, and the anvil electrode 320, drum 310 being covered by master 313*a*, the charged copy recording medium 321 is fed to inking and fixing stations (not shown).

By continuous rotation around supporting shaft 323, the drum 310 exposes the message on master 313*a* repeatedly to sections of the copy medium 321. The message on medium 313*a* is duplicated repeatedly until sufficient copies are produced on medium 321.

Figure 8:
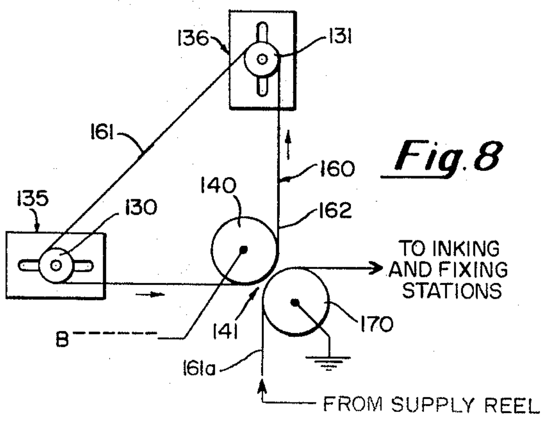
FIG. 8 is a schematic representation of another form of embodiment of the duplicating means and method of the invention adapted to receive an adjustable length mirror image containing recording medium master and to make multiple copies thereof.

Referring to FIG. 8 of the drawings, a drum electrode 140 and an opposed drum electrode 170 together form duplicating station 141. Drum 140 is connected to a source B−−−−−. Drum 170 is grounded. A pair of cylinder adjusting mechanisms 130 and 131 are mounted at predetermined distances from electrode 140. The distance adjusting assembly 130 includes a roller member 135. The distance adjusting assembly 131 includes a roller member 136. A length of master recording medium 160 is joined by jointure 161 and the closed loop is engaged around the triangle formed by electrode 140, roller 135 and roller 136. Rollers 135 and 136 are then adjusted in assemblies 130 and 131 respectively to draw the closed loop from the tape 160 taut. Member 140, as described hereinabove, is at potential from source B−−−−− sufficient to cause discharge from the printed surface 162 of medium 160 toward the electrode 170. Advanced around the portion of the cylindrical surface of electrode 170 opposite the electrode 140 is a copy tape 161*a* toward which the discharge from the inked fixed recording medium 162 is directed. In this embodiment, the copy medium 161*a* is supplied from a supply reel (not shown) and after being charged in duplicating station 141 the copy 161*a* is sent to inking and fixing means.

This embodiment, in operation, is similar to that of FIG. 7. However, it provides adjustment by adjusting assemblies 130 and 131 and is suitable for a message length where enlarging the size of drum 310 of FIG. 7 would be impractical.

Referring to FIGS. 9*a*, *b*, *c* and *d* of the drawings, FIG. 9*a* shows an inked and fixed true image master of intelligence formed by spots 400. Upon discharge of spots 400 therefrom which have been inked and fixed on the master charges of the mirror image shape of the configuration of spots 400 are impressed upon the copy as shown by the circles 401 on the copy material of FIG. 9*b*. A new master mirror image is provided by inking and fixing charges 401 to form the inked and fixed mirror image master comprised by the spots 402 of FIG. 9*c*. The inked fixed master of FIG. 9*c* when discharged to copy recording material provides the true charged image copy formed of the circles 403 in FIG. 9*d*. Circles 403 of FIG. 9*d* and circles 401 of FIG. 9*b* represent charged but uninked areas on the recording medium after transfer by discharge at a duplicating station of the invention. After inking and fixing the true image copy appears as represented by the filled in circular spot 400 of FIG. 9*a*.

In the embodiments of FIGS. 1, 2, 3, 4, 6, 7, and 8, the pins are charged to provide a mirror image. The master appears as an inked and fixed mirror image of the true image of the message as shown in FIG. 9*c*. After discharge occurs at the duplicating station, the true image charged copy of FIG. 9*d* is produced. After inking and fixing this is the true image inked and fixed copy shown in FIG. 9*a* is produced.

In the embodiment of FIG. 5, a true image master is provided by so charging the pins in the print head at the electrostatic printing station. As shown in FIG. 9*a* upon discharge at recording station 51 a copy is provided which is charged with a mirror image of the true message as in FIG. 9*b*. After inking and fixing, the copy of FIG. 9*b* is transformed to the state shown in FIG. 9*c*. After rerunning through duplicating station 76 of FIG. 5, the copy appears as the charged true image such as shown in FIG. 9*d*. Upon inking and fixing respectively in inking station 53 and fixing station 56, the copy becomes the true image copy illustrated in FIG. 9*a*.

The various embodiments are represented schematically by way of illustration only. Conventional means such as means to advance the tape in each of the embodiments shown are obvious. These are not illustrated for purposes of clarity of the illustration. It should also be understood that the invention is not restricted to the particular inks and recording media shown.

In each of the systems illustrated, the master can be used substantially an unlimited number of times, rerunning the master and charging between it, and the copy does not impair the efficiency of the master to provide a source of discharge.

At the duplicating stations in the illustrative embodiments because of the capacitance formed by the paper and its dielectric between the two electrode plates or rollers of each embodiment and because the actual discharge point is the spots on the underside of the paper rather than the charged electrode plate or drum, a delay in discharge occurs. This is due to the resistance and capacitance provided by the capacitor formed by the electrodes from which difference in potential appears between the conductive backing layers of the dielectric coated paper and a capacitative path is present across the dielectric of the tape. This causes an appreciable finite time for discharge due to the RC time constant. This finite time decreased the speed of discharge from less than a nanosecond to microseconds. Thus it becomes to pull the recording medium material too fast. The speed of the machines must be regulated accordingly.

Should skew printing result, means such as slight displacement of the tape or otherwise known to the art, can be introduced without departing from the spirit of this invention in order to avoid such difficulties.

While the principles of the invention have now been made clear, there will be immediately obvious to those skilled in the art many modifications in structure, arrangement, proportions, the elements and components used in the practice of the invention, and otherwise, which are particularly adapted for specific environments and operating requirements without departing from those principles. The appended claims are therefore intended to cover and embrace any such modifications within the limits only of the true spirit and scope of the invention.

What is claimed is:

1. A method of electrostatic duplication of an electrostatically printed master recording medium charged and impregnated in a predetermined marking pattern with conductive ink of cathode acting material which conductive ink has been fixed to said master, said method comprising, moving the master in abutting relationship past a first conductive member, moving a copy recording medium capable of retaining electrostatic charges in alignment with and in proximity to but spaced from and facing said ink pattern on said master and in abutting relationship past a second conductive member and applying a voltage difference across said conductive members of potential sufficient to enable electrostatic discharge between the inked surface of said master and the opposed surface of said copy.

2. A method of reproducing a message which has been recorded, inked with a conductive ink, and fixed; in the dielectric coating of a dielectric coated first medium by electrostatic printing means wherein, when recorded a discharge occurs between a first and a second electrode onto said medium, which medium was positioned between the electrodes, said method comprising, removably passing said medium in contiguous relationship to and then away from a first conductive member with the dielectric coating facing away from said conductive member; simultaneously removably passing a blank copy second dielectric medium in contiguous relationship to and then away from a second conductive member and holding said first medium and said second medium separated in slightly spaced apart relationship, when said first and second media are in said conductive member contiguous relationships; said conductive members being positioned in aligned parallel relationship, establishing an electric field of relatively high voltage between said conductive members such that the conductive ink printed and fixed on said first copy acts as a cathode which emits electric charges to form an electrostatic charge mirror image on the second copy corresponding to the conductively inked fixed image on said first copy, said first copy being transported so that its conductively inked fixed surface faces away from said first conductive member and towards the dielectric surface of said second medium when said copy is passed in contiguous relation to said first conductive member.

3. A method of reproducing a pattern of conductive ink disposed and fixed on a charged pattern of a dielectric layer of a first recording medium wherein the medium comprises a relatively conductive layer and said dielectric layer, said method comprising removably positioning said medium with its conductive layer disposed in facing relationship to a first conductive member, removably positioning a second receiving recording medium which is capable of retaining electrostatic charges closely adjacent to and having a first surface facing the inked and fixed pattern surface of said first medium, supporting said second medium on its medium surface opposite said first surface contiguous to a second conductive anvil member, biasing said first conductive member with respect to said second conductive member such that the difference in potential between said first and second members is sufficient to cause ionic discharge from said fixed conductive ink of said first recording medium to said second recording medium; said first medium conductive pattern discharging a mirror image of itself upon said receiving recording medium through the filed caused by the voltage between the first conductive member which is contiguous to said first tape conductive layer and the removed voltage of said second conductive member, removing said second medium away from said anvil member, inking said second medium to form a visible inked copy, fixing the ink on said inked copy and removing said first medium away from said first conductive member.

4. Duplicating apparatus comprising a master including a relatively conductive layer and a dielectric layer superimposed adjacent said conductive layer, said master being electrostatistically charged in a pattern upon said dielectric layer, said charge pattern being inked with a conductive ink and said conductive ink being fixed; a copy comprising a relatively conductive layer and a dielectric layer superimposed adjacent said conductive layer, means to move said master and said copy to a facing closely adjacent relationship such that the inked and fixed portion of said master faces the dielectric layer of said copy, said ink having the characteristic of electrostatically discharging in a high voltage electrostatic field, means to bias said master at a relatively high negative voltage, means to bias said copy at a voltage positive with respect to said negative high voltage such that the voltage between said master and copy causes electrostatic discharge from the fixed conductive ink pattern to the dielectric face of said copy and means to remove said master and said copy away from said closely adjacent facing relationship.

5. Apparatus for reproduction of information comprising a master, said master having a surface which is electrostatistically charged, inked with a conductive ink, and fixed in an information pattern, a copy medium capable of retaining electrostatic charges, means to removably superimpose said master and said copy such that said conductive removably inked master is disposed in parallel with and closely adjacent to said copy in superimposed, spaced relationship whereby the master charged inked and fixed surface faces the chargeable copy surface, means to apply a first voltage to said master and means to apply a second voltage to said copy, the difference between said voltages being of magnitude to electrostatically discharge said pattern on said master to be reproduced on said copy and means to remove said copy from its position adjacent to said master.

6. Duplicating apparatus comprising a master recording medium having an inked and fixed electrostatistically charged and printed master recording medium surface, the ink on said inked and fixed surface comprising conductive ink, a first and a second electrode, a copy recording medium having at least one surface which is charge-retentive, means to apply a potential difference across said first and second electrodes, means to move said master medium in slidably bearing relationship past said first electrode and with its printed surface facing away from said electrode means to move said copy medium being positioned in slidably bearing relationship past said second electrode with said copy charge-retentive surface facing said master printed surface, the difference in potential between said first and second electrodes being of magnitude sufficient to cause a discharge from the printing on said master to said copy, means to apply ink to the charged surface of said copy to impart visibility and means to fix the ink in said copy to provide permanence.

7. Means to duplicate a message comprising a first sheet of dielectric coated paper, means to charge the dielectric coat of said sheet electrostatically with message spots, means to ink said charged spots with a conductive ink which has properties of enabling emission such that the ink spots when fixed act as cathodes, means to fix said ink spots, a second sheet of dielectric coated paper comprising a copy sheet, a first electrode, a second electrode aligned with said first electrode, means to move said master past said first electrode and said copy past said second electrode such that said master is removably positioned over said copy sheet in superimposed aligned spaced relationship such that the master dielectric coating faces the copy dielectric coating, and means to apply voltage of magnitude to the back of the master and to ground the back of the copy when in said aligned relationship, such that the difference in voltage between the grounded copy and the voltage applied to the master is sufficient to cause a discharge to occur between the master spots which act as a cathode emission source and the copy paper.

8. Electrostatic printing copying means for duplicating a message comprising a first recording medium having a dielectric surface upon which has been recorded electrostatic printing charges corresponding to the message, and which charges have been inked by use of conductive ink, said ink having been fixed, said fixed ink being of material which is capable of directionally emitting charges in an electric field of high potential, a second recording medium comprising a copy recording medium which is capable of retaining electrostatic charges to receive the message, said copy medium comprising a recording surface of material to receive an electrostatic charge thereon, a first electrode biased at a relatively high potential, a second electrode biased at a potential removed from the potential of said first electrode, means to move said first dielectric recording medium in abutting relationship past said first electrode, means to move said second copy recording medium in abutting relationship past said second electrode, such that said first electrode, first recording dielectric medium, second copy recording medium and second electrode are in aligned relationship, said inked dielectric surface of said first recording medium is facing the recording surface of said second copy message receiving material and said first and second recording media are separated by a small distance of the order of millimeters, the difference in potential between said first and second electrodes being sufficient to enable electrostatic discharge from the conductively inked and fixed charges in the recording dielectric surface of said first medium toward said second electrode to charge said second copy recording material with a charged image of said conductively inked and fixed message.

9. Electrostatic printing duplicating means, comprising a first electrostatic recording medium having a dielectric surface on which a message is electrostatically charged, inked with a conductive ink and fixed to form an electric charge emitter upon application of sufficient discharge potential thereto, first and second recording medium comprising a closely spaced, aligned electrode member, a second copy recording medium which is capable of retaining electrostatic charges which charges when received constitute a duplicate mirror copy of said message from the master dielectric recording material, means to move said master and said copy past said electrode members such that the dielectric surface of the master is in opposed closely spaced facing relationship to the recording surface of the copy and said recording surfaces are aligned with said electrode members, means to apply sufficient potential across said first and second electrodes which potential is applied to said conductive ink on said dielectric surface of said first recording medium such that a discharge takes place which transposes avalanches of electrical charges from the message on the dielectric recording master onto the receiving surface of the copy, and means to ink the message received on said copy.

10. The apparatus of claim 9 wherein said first and second electrodes each constitute a plate having a flat bearing surface and wherein said means to apply potential difference comprises a source of negative voltage connected to said first plate electrode, said voltage being of the order of approximately 1000 to 2000 volts, said second plate electrode being grounded.

11. The apparatus of claim 9 wherein said first and second electrodes each constitutes a cylindrical roller and wherein said means to apply potential difference comprises a source of voltage of the order of approximately 1000 to 2000 volts connected to said first roller electrode and means to ground said second roller electrode, said means to move said master and said copy comprising means to draw said master first medium and said copy second medium over said first and said second roller electrodes respectively at a rate of travel to enable said discharge from said master to said copy to be effected.

12. Apparatus for providing multiple copies at a rapid rate of speed, said apparatus comprising a master recording material supply source, said master material comprising a layer of relatively conductive material and a layer of dielectric material, means to electrostatically record information on said dielectric layer of said master comprising means to charge portions of said dielectric layer in accordance with the information, means to apply conductive ink to said charged portion of said dielectric layer and means to fix said conductive ink; means to supply copy recording material, said copy material comprising a dielectric layer and a layer of relatively conductive material, a first and a second electrode, means to move said master material and said copy material past said electrodes so that said copy supply material is disposed such that its dielectric layer is positioned in parallel relationship to and adjacent the recording containing dielectric surface of said master material and said master material is separated from said copy material by a distance of the order of a few millimeters, and said master is in contact with said first electrode and said copy is in contact with said second electrode, means to apply a potential difference across said first and said second electrodes of value sufficient to cause electrostatic discharge from the inked and fixed pattern on said master to the dielectric surface of said copy, means to ink the charged copy surface and means to fix the ink on said copy after said discharge has occurred from said conductive pattern on said master to said dielectric surface of said copy.

13. The apparatus of claim 12 wherein said electrostatic recording on said master comprises a mirror image of the required true message to be put on said copy, said apparatus including means to receive said finished copy.

14. Apparatus for providing predetermined intelligence on a master and at least one copy, said apparatus comprising a master first recording material including a relatively conductive flat layer coated by a relative dielectric flat layer, means to electrostatically print a fixed conductive ink pattern on said master dielectric layer surface in accordance with the predetermined intelligence, a copy second recording material comprising a relatively conductive flat layer coated by a relatively dielectric flat layer, means to discharge from said pattern on said master to said copy wherein said copy receives an electrographic discharge of the master pattern thereupon; said discharge means comprising a pair of electrodes, means to move said master and said copy in overlaying aligned closely separated dielectric surface facing relationship past said pair of electrodes such that the first of said pair of electrodes and said master is positioned in overlaying abutting aligned relationship when in discharging condition and the second of said pair of electrodes and said copy is positioned in overlaying abutting aligned relationship when in discharge receiving condition, means to supply potential across said pair of electrodes to cause said electrographic discharge from said master to said copy, said electrodes, said master and said copy being in overlaying aligned position when said discharge is effected, said master inked and fixed dielectric layer facing said copy dielectric layer when in said discharging position, said discharge causing said copy to receive a mirror image of said predetermined intelligence on said master.

15. Duplicating means comprising a master first sheet of dielectric coated paper charged with message spots, said spots being inked with a conductive ink material which can be used as a cathode, said inked spots being fixed, a copy second sheet of dielectric coated paper, means to apply voltage to the paper back of said master, means to ground said copy paper back, means to support the master and copy to cause the dielectric copy layer to face the dielectric master layer where the voltage is applied, said voltage being sufficient to effect discharge between the master spots and the copy, means to transport said master and said copy past said supporting and voltage applying means; means to fix said inked copy, said copy thereby containing a mirror image duplicate of the said master.

16. The means of claim 15 including a second means to apply discharge magnitude voltage to the paper back of said master after said first application of voltage to said paper back of said master, a copy third sheet of dielectric coated paper, means to ground said copy third sheet, said master dielectric coat and said copy third dielectric coat being positioned in opposed slightly separated aligned and facing relationship when said second voltage and said copy third sheet ground are respectively applied to said master first sheet and said copy third sheet to thereby cause discharge from said master spots to said copy third sheet and means to transport said master from said master support means and to transport said third copy sheet past said second means to apply discharge magnitude voltage wherein said master and third copy dielectric coats are in said aligned slightly separated, facing relationship.

17. The means of claim 15 wherein said second copy spots comprise conductive ink and including second means to apply discharge magnitude voltage, said second voltage means being applied to the paper back of said inked and fixed copy second sheet, a copy third sheet of dielectric coated paper, means to ground said copy third sheet, said copy second sheet and said copy third sheet being positioned in opposed slightly separated aligned relationship with their dielectric coats facing each other when said second voltage and said copy third sheet ground are respectively applied to said second sheet and said third sheet to thereby cause discharge from said copy second sheet inked and fixed spots to said copy third sheet and means to move said copy second sheet and said third copy sheet past said second means to apply discharge magnitude voltage and to ground said third copy sheet wherein the second and third copy sheets are in said opposed aligned relationship.

References Cited by the Examiner

UNITED STATES PATENTS

| | | | |
|---|---|---|---|
| 2,912,586 | 11/59 | Gundlach | 250—49.5 |
| 2,914,996 | 12/59 | Whitham | 117—17.5 X |
| 2,919,170 | 12/59 | Epstein | 346—74 |
| 2,919,171 | 12/59 | Epstein et al. | 346—7 XR |
| 2,955,894 | 10/60 | Epstein | 346—74 |
| 2,978,968 | 4/61 | Schwertz | 118—17.5 |
| 2,982,647 | 5/61 | Carlson et al. | 96—1 |
| 3,015,304 | 1/62 | Carlson et al. | 118—637 |
| 3,023,731 | 3/62 | Schwertz | 118—637 X |
| 3,051,568 | 8/62 | Kaprelian | 96—1 |
| 3,084,061 | 3/63 | Hall | 117—17.5 |

FOREIGN PATENTS

| | | |
|---|---|---|
| 734,909 | 8/52 | Great Britain. |

WILLIAM D. MARTIN, *Primary Examiner.*

UNITED STATES PATENT OFFICE

CERTIFICATE OF CORRECTION

Patent No. 3,194,674 July 13, 1965

Richard S. Sakurai

It is hereby certified that error appears in the above numbered patent requiring correction and that the said Letters Patent should read as corrected below.

Column 1, line 19, for "letter" read -- letters --; line 71, for "ink" read -- inked --; column 3, line 57, for "45H" read -- 450H --; column 3, line 64, after "xylene" insert -- -- solvent --; line 69, for "millet" read -- milled --; column 4, line 4, for "the" read -- The --; line 48, for "Abee" read -- Abbe --; column 8, line 45, for "polythylene" read -- polyethylene --; line 60, for "of" read -- or --; line 66, for "miles" read -- mils --; same column 8, line 68, for "thickness" read -- thicknesses --; column 9, line 18, for "in" read -- an --; column 10, line 23, for "inalignment" read -- in alignment --; column 14, line 29, after "between" insert -- drums --; column 16, line 67, after "becomes" insert -- possible --; column 17, line 26, for "fixed;" read -- fixed --; line 74, for "filed" read -- field --; column 18, lines 10 and 30, for "electrostatistically", each occurrence, read -- electrostatically --; same column 18, line 54, for "said electrode" read -- said first electrode, --; column 19, lines 46 to 48, for "recording medium comprising a closely spaced, aligned electrode member, a second" read -- closely spaced, aligned electrode members, a second recording medium comprising a --; column 21, lines 9 and 10, for "; means to fix said inked copy," read -- , means to ink said copy, --.

Signed and sealed this 3rd day of May 1966.

(SEAL)
Attest:

ERNEST W. SWIDER
Attesting Officer

EDWARD J. BRENNER
Commissioner of Patents